(12) United States Patent
Greve

(10) Patent No.: US 6,523,672 B2
(45) Date of Patent: Feb. 25, 2003

(54) ZERO-BACK-PRESSURE CONVEYOR WITH INVERTED ROLLER BELT LOOP

(75) Inventor: Christopher G. Greve, Covington, LA (US)

(73) Assignee: The Laitram Corporation, Harahan, LA (US)

( * ) Notice: Subject to any disclaimer, the term of this patent is extended or adjusted under 35 U.S.C. 154(b) by 0 days.

(21) Appl. No.: 09/915,097

(22) Filed: Jul. 25, 2001

(65) Prior Publication Data

US 2003/0019721 A1 Jan. 30, 2003

(51) Int. Cl.[7] .................. B65G 47/28; B65G 43/00; B65G 47/26; B65G 47/31
(52) U.S. Cl. ................ 198/459.8; 198/460.1; 198/460.3
(58) Field of Search .................. 198/459.8, 460.1, 198/460.3, 463.3, 774.1, 802, 809, 810.1, 817

(56) References Cited

U.S. PATENT DOCUMENTS

| 3,934,707 | A | * | 1/1976 | Bowman | ........... 198/460.1 |
| 3,951,254 | A | * | 4/1976 | Juhrend | ............... 198/809 |
| 4,909,378 | A | * | 3/1990 | Webb | ............... 198/809 |
| 5,085,311 | A | | 2/1992 | Garro | |
| 5,810,158 | A | * | 9/1998 | Schiesser et al. | ........ 198/460.1 |
| 6,168,007 | B1 | | 1/2001 | Tarlton | |
| 6,193,054 | B1 | | 2/2001 | Henson et al. | |
| 6,364,095 | B1 | | 4/2002 | Layne et al. | |

* cited by examiner

Primary Examiner—Christoher P. Ellis
Assistant Examiner—Gene O. Crawford
(74) Attorney, Agent, or Firm—James T. Cronvich

(57) ABSTRACT

A zero-back pressure conveyor in which a transport belt is flanked on opposite sides by two series of inverted roller belt loops. The transport belt forms an upper carryway for transporting articles in a transport direction between the two series of inverted roller belt loops, each of which forms a top supportway. The supportways of corresponding pairs of belt loops are generally coplanar and jointly support an article. The transport belt and each pair of inverted roller belt loops are relatively positionable between a first position in which the upper carryway of the transport belt is generally coplanar with the supportways of the pair of flanking belt loops and a second position in which the carryway is below the plane of the supportways. Thus, in the first position, the transport belt is positioned to contact conveyed articles to move them in the transport direction; and, in the second position, the transport belt is out of contact with the articles. In this way, zero-back-pressure accumulation zones are formed by each pair of inverted roller belt loops. The inverted roller belt loop is constructed of a plurality of belt modules. Each module has a generally flat surface on one side and one or more rollers on the second side to enable the module body to be rolled in the roll direction. The modules are hingedly interconnected by hinge pins and arranged with the first flat sides outward and the roller-topped sides inward to form the inverted roller belt loop.

11 Claims, 7 Drawing Sheets

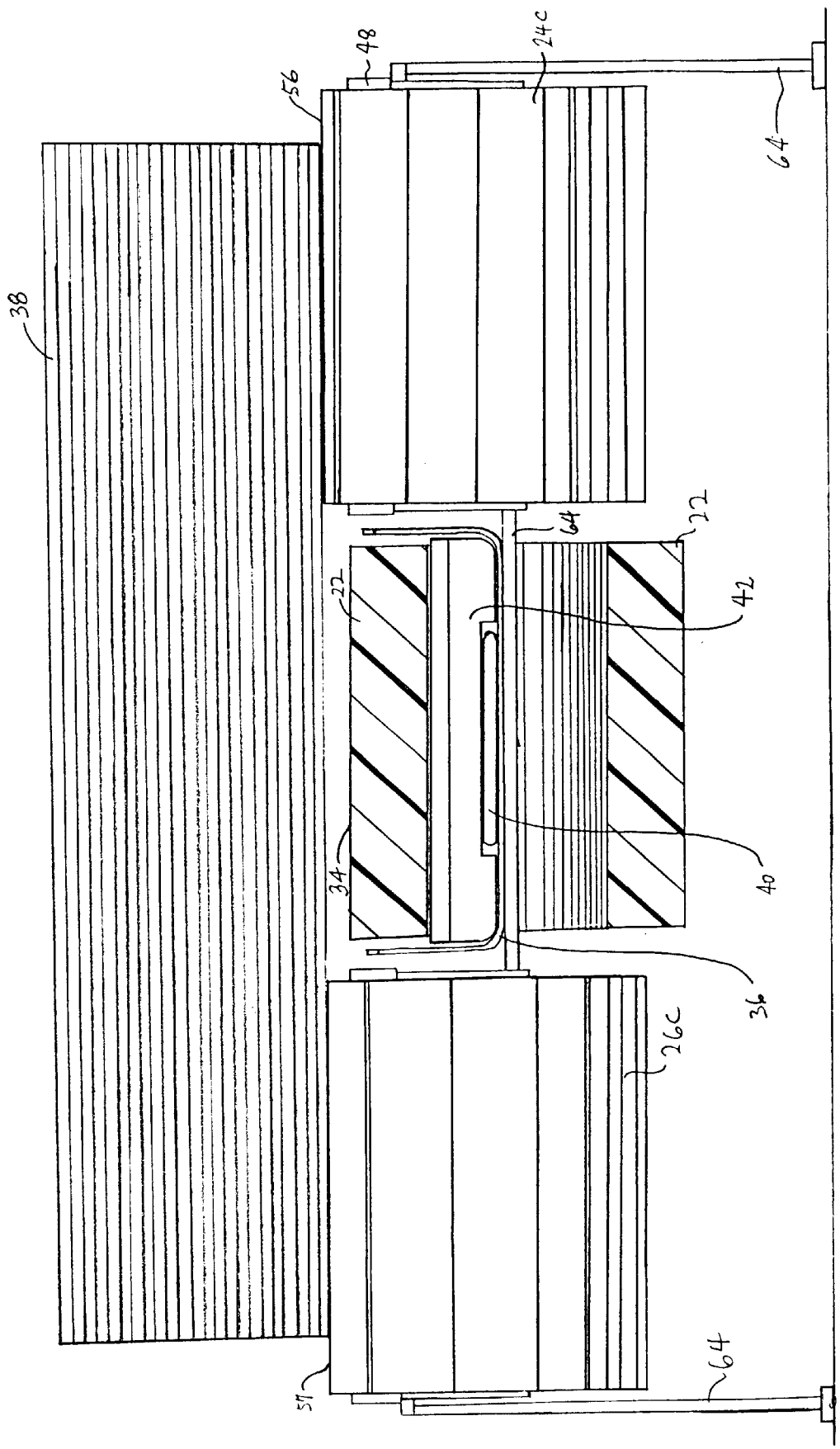

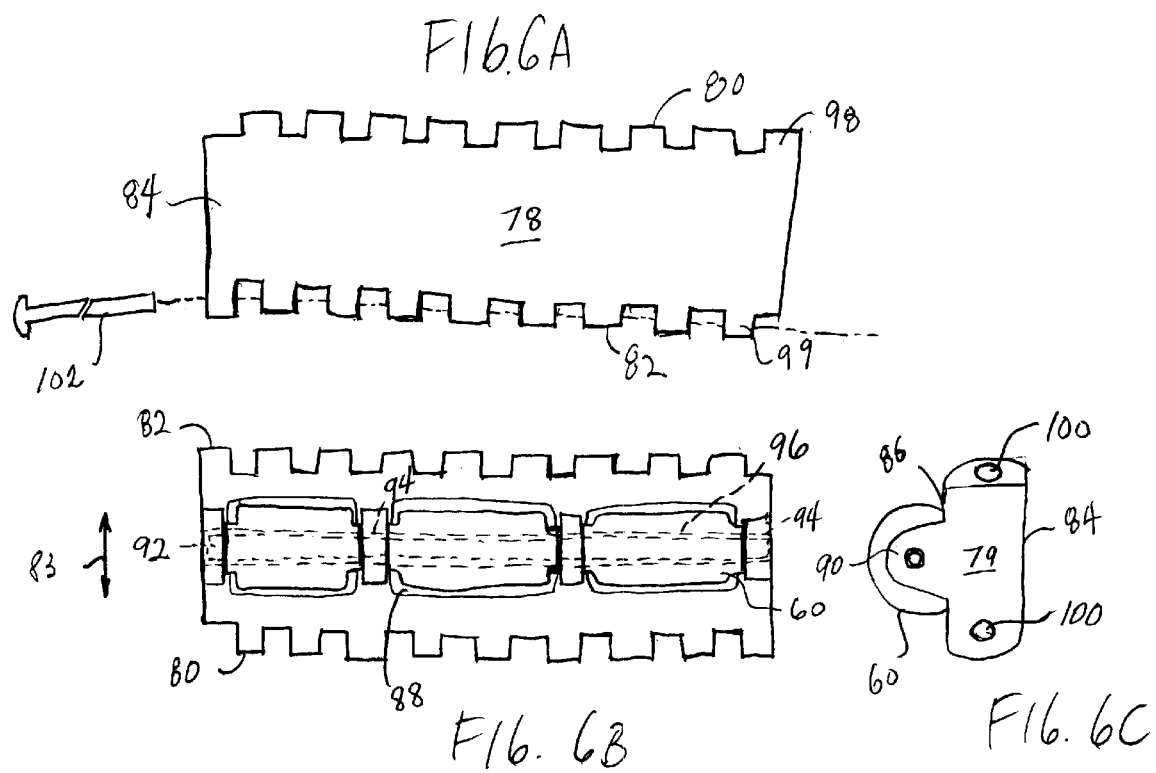

ZERO-BACK-PRESSURE CONVEYOR WITH INVERTED ROLLER BELT LOOP

BACKGROUND

This invention relates generally to conveyors and, more particularly, to accumulation conveyor systems that achieve zero back pressure by selectively coupling articles to and decoupling them from a transport belt in individual accumulation zones along a conveying path.

When articles being conveyed on a moving conveyor start to back up, trailing articles push against leading articles. The result is a buildup of backline pressure, which is greatest on the lead articles. Too much backline pressure can crush or otherwise damage the articles and load the conveyor because of the dynamic friction between the moving conveyor and the stalled or slowly-moving articles.

In the corrugated industry, stacks of cardboard sheets are conveyed along a processing line. A common way to convey these stacks is with powered roller conveyors. In these conveyhors, parallel cylindrical rollers with axes of rotation transverse to the conveying direction are arranged to form a rolling conveyor bed. Drive belts are often used to contact the rollers to rotate them and propel the stacks along the roller bed. To eliminate backline pressure by preventing consecutive stacks from bumping into each other, the roller conveyor is divided into successive accumulation zones. The rollers in one zone are powered independently of those in another zone. In this way, when a downstream stack is stopped in one zone of the conveyor, the trailing upstream stack can be moved from zone to zone and stopped in the zone just upstream of the stopped downstream stack without contact. Various drive arrangements are used to achieve individual zonal control by selectively engaging the rollers in each zone with the drive belt.

In another version, a conveyor belt is flanked on each side by a roller conveyor bed. The stack of cardboard sheets rests atop both roller conveyor belts. Portions of the conveyor belt are raised and lowered into and out of contact with the bottom of the stacks. When raised into contact, the conveyor belt transports the stack along; when the belt is lowered out of contact, the stack rests in place on the two roller conveyor beds. Thus, each portion of the conveyor belt that can be raised and lowered defines an accumulation zone.

But these zero-back-pressure roller conveyors have shortcomings. The rollers have a tendency to freeze up or their mounting holes to wallow out over time, resulting in such performance deficiencies as increased friction against the conveyed stacks, a bumpy conveyor bed, and excessive noise. Roller conveyors also cause a stack of cardboard to form an "elephant foot" as it is conveyed. There are a couple of causes for the "elephant foot." As the stack traverses the spacing between consecutive rollers, the leading edge of the bottom-most sheets bumps into the upcoming roller. Each time this occurs, the sheets above tend to creep forward relative to the bottom sheets. Article creep is also caused by a wave effect. The weight of the stack on the bottom-most sheets makes them conform to the rollers. The closer a sheet is to the bottom of the stack, the more it deforms around the rollers into the inter-roller gaps and adopts a wavy shape. As the stack moves over the rollers, the wave dynamically propagates. upward into the stack, causing adjacent sheets at the bottom of the stack to creep. On a long conveying path over many rollers, the side profile of the stack resembles an "elephant foot" with the leading edge of the bottom-most sheet lagging the leading edge of the topmost sheets. If the "elephant foot" becomes too exaggerated, the stack becomes unstable, and sheets tip over, requiring manual intervention to rearrange the stack.

One way to achieve zero back pressure and minimize the "elephant foot" problem is to use a series of conveyor belts, or chains, arranged end to end with a small space between consecutive belts. Each belt, which forms an accumulation zone, is individually controlled by its own drive train and sprockets or pulleys. The flat conveying surfaces provided by the belts avoid the bumpiness of a roller conveyor, and the "elephant foot" problem is minimized. But such an arrangement is more complex and costly in that multiple sprockets, shafts, and drive motors are required to handle all of the zones, especially in a long conveyor system.

Thus, there is a need for a zero-back-pressure conveyor that eliminates the problems with transporting sheets of cardboard and other articles and that lacks the shortcomings of conventional conveyor systems.

SUMMARY

These needs and others are satisfied by a zero-back pressure conveyor having features of the invention. In one embodiment, the conveyor includes a transport belt flanked on opposite sides by a first and a second series of inverted roller belt loops arranged in pairs. The transport belt forms an upper carryway for transporting articles in a transport direction between the two series of inverted roller belt loops, each of which forms a top supportway. The supportways of each pair of belt loops are generally coplanar and jointly support an article. The transport belt and each pair of inverted roller belt loops are relatively positionable between a first position in which the upper carryway of the transport belt is generally coplanar with the supportways of the pair of flanking belt loops and a second position in which the carryway is below the plane of the supportways. Thus, in the first position, the transport belt is positioned to contact conveyed articles to move them in the transport direction; and, in the second position, the transport belt is out of contact with the articles. In this way, zero-back-pressure accumulation zones are formed by each pair of inverted roller belt loops.

In one version of the zero-back-pressure conveyor, the position of the carryway relative to the supportways is controlled by a belt-positioning mechanism that raises and lowers the transport belt in each accumulation zone between a first position with the transport belt contacting the conveyed article and a second position with the transport belt out of contact with the article. In one simple embodiment, the belt-positioning mechanism includes an inflatable air tube in each accumulation zone supported in a pan. A slider bed supported on the air tube, in turn, supports the transport belt. A controller controls a supply of air to inflate and deflate the air tube and thereby raise and lower the slider bed and the transport belt into and out of contact with supported articles in each accumulation zone. Because the articles are jointly supported across the stationary supportways, the belt-positioning mechanism has to lift only the transport belt and not the weight of the articles.

One version of the inverted roller belt loop is constructed of a plurality of belt modules and hinge pins. Each module. includes a module body that extends from a first end to a second end in a roll direction and through the body's thickness from a first side to an opposite second side. The first side has a generally flat surface. A roller is positioned on the second side to enable the module body to be rolled in the roll direction. Hinge elements along the first end are interleaved with hinge elements along the second end of an adjacent module and interconnected by hinge pins into an endless articulating belt loop. The modules are arranged with the first flat sides outward and the roller-topped sides inward to form the inverted roller belt loop. Articles on the flat supportway surface of the inverted roller belt loop are supported stably in each accumulation zone. By their low-friction contact with the roller bed, the rollers allow the conveyed articles to move with the inverted roller belt loop without slipping. The extended flat supportway is especially effective in eliminating the bumpy ride to which articles, such as stacks of cardboard sheets, are subjected in conventional roller conveyors. Thus, the "elephant foot" problem is reduced in severity. Because the inverted roller belt loops need not be powered, only one drive system—that for driving the transport belt—is needed.

DRAWINGS

These and other advantages, features, and aspects of the invention are described in more detail in the following description, appended claims, and accompanying drawings in which:

FIG. 4A is a cross-sectional view of the zero-back-pressure conveyor system taken along cut line 4A—4A of FIG. 1 and including some of the supporting framework;

FIGS. 6A, 6B, and 6C are top, bottom, and side elevation views of a roller belt module usable in the zero-back-pressure conveyor of FIG. 1.

DETAILED DESCRIPTION

Figure 1:
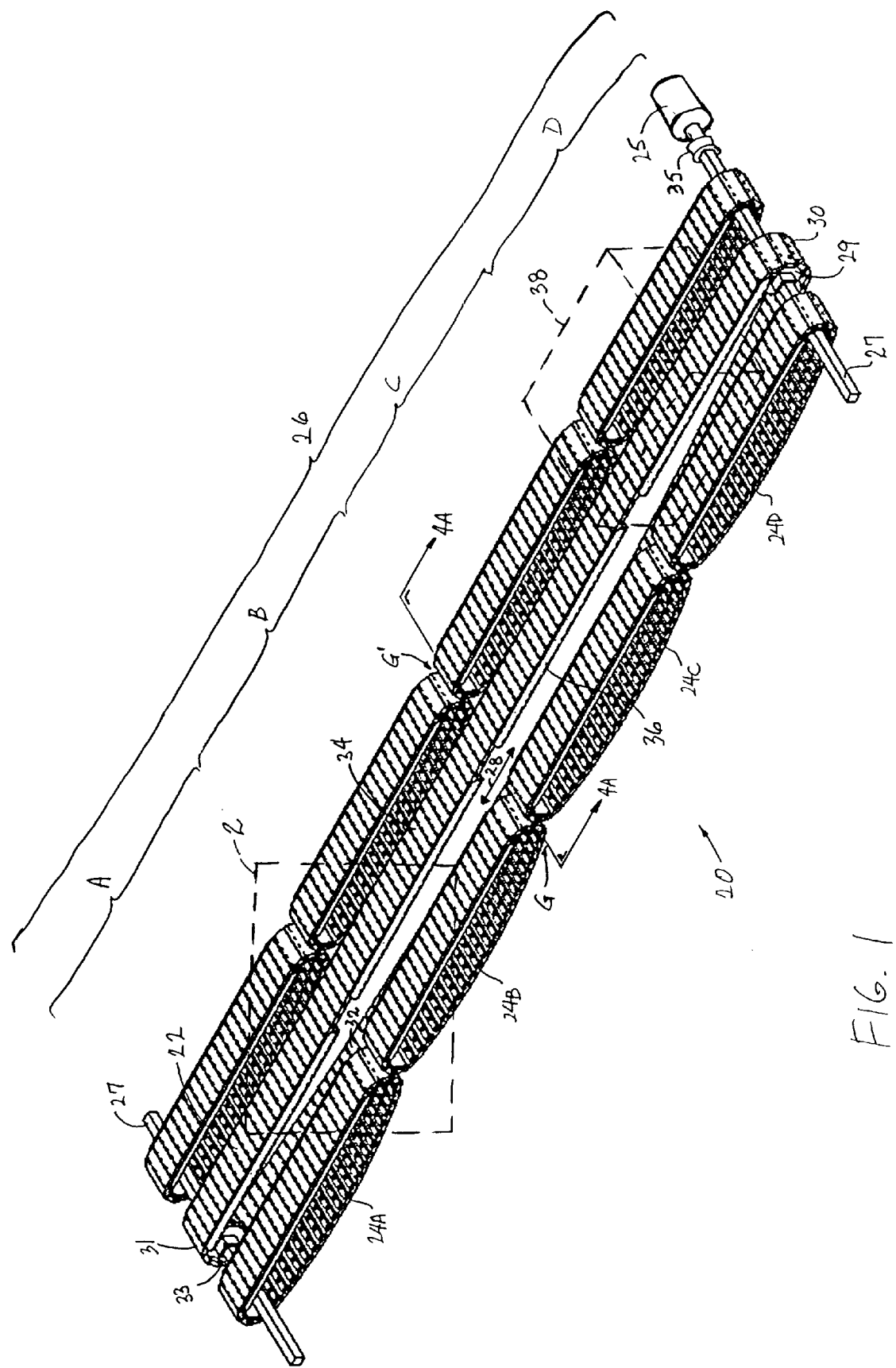
FIG. 1 is an isometric view of an exemplary four-zone zero-back-pressure conveyor according to the invention with the conveyor frame omitted for clarity.

One version of a zero-back-pressure conveyor having features of the invention is shown in FIG. 1. The support framework is not shown in the figure to better focus on the novel features of the invention. The conveyor 20 includes a central transport belt 22 flanked by first and second series 24, 26 of low-friction article support assemblies 24A–D and 26A–D arranged, for example, in corresponding pairs. The transport belt is driven in a direction of transport 28, which may be bidirectional, by conventional driving means, such as a drive motor 25 coupled by a coupling 35 to a shaft 27 including drive sprockets 29 or, as one alternative, a motorized pulley. In the example of FIG. 1, the transport belt 22 is a modular plastic belt of the kind manufactured and sold by, for example, Intralox, Inc., of Harahan, La., USA. Such a belt is typically driven at one end 30 of the conveyor. The teeth of the drive sprockets engage structure on the inner side of the endless belt to drive and track the belt. A set of idler sprockets 33 on a shaft 27 or a pulley at the opposite end 31 of the conveyor direct the belt from a returnway 32 onto an upper carryway 34. The belt is supported along the upper carryway in a series of pans 36.

The preferred modular plastic belt is made of a plurality of individual modules linked end to end by hinge pins through interleaved hinge elements of each module into an endless belt loop capable of articulating about a sprocket or pulley. Transport belts other than modular plastic belts, such as metal belts or chains, fabric belts, or rubber belts, could alternatively be used in the zero-back-pressure conveyor of the invention.

The example conveyor shown in FIG. 1 has four accumulation zones A–D. Each zone is defined by corresponding gaps G, G' formed between consecutive low-friction article support assemblies, e.g., 24B and 24C, 26B and 26C. The first and second series of support assemblies 24, 26, which are arranged parallel to each other and to the transport belt, define first and second sides of a conveying path. Articles 38 are supported on the conveyor with one side of the bottom resting on the first article support assembly and the other side of the bottom on the second article support assembly. The transport belt is positioned beneath the articles and between the flanking article-support assemblies.

Figure 2:
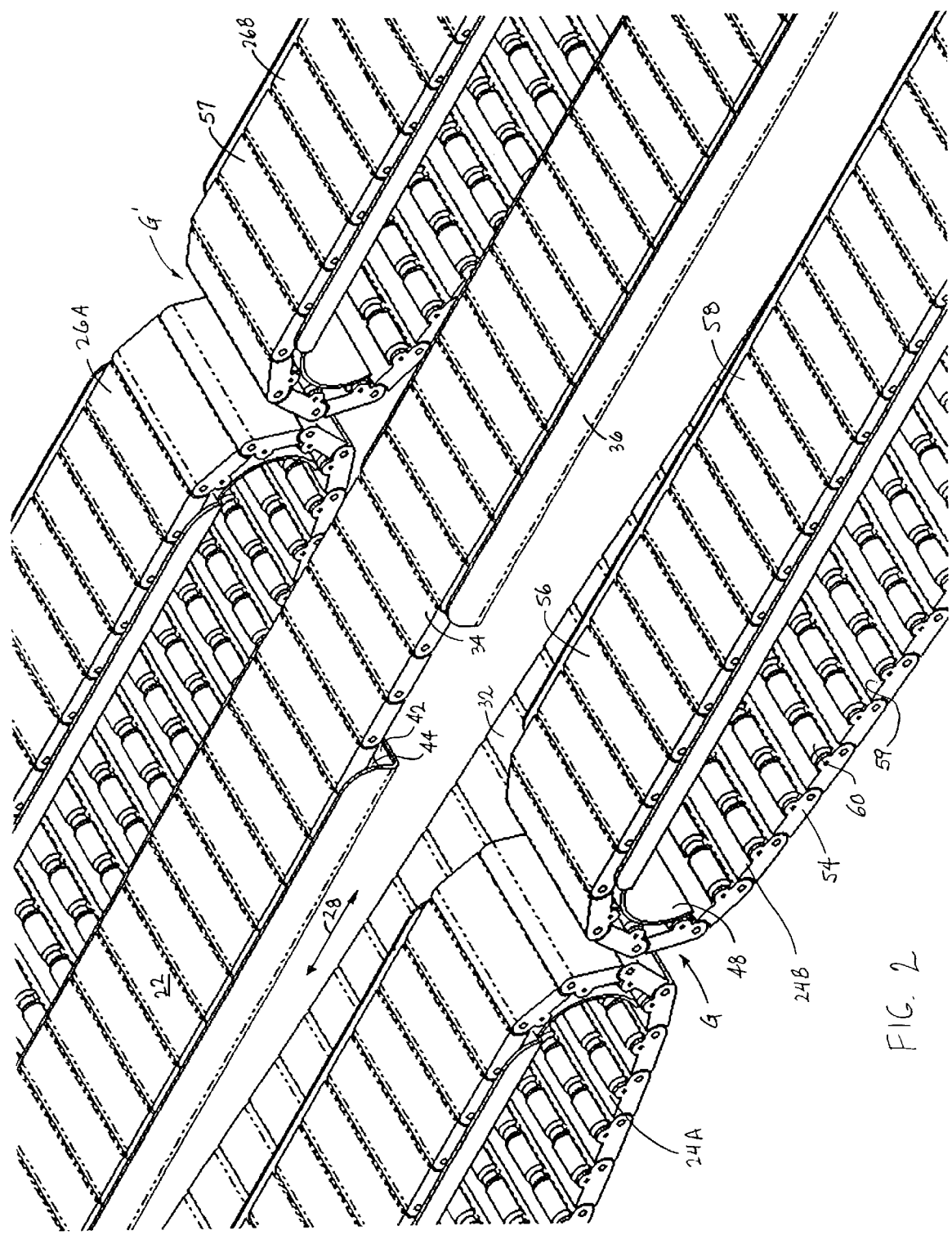
FIG. 2 is a blow-up of a portion of the zero-back-pressure conveyor of FIG. 1.
Figure 3:
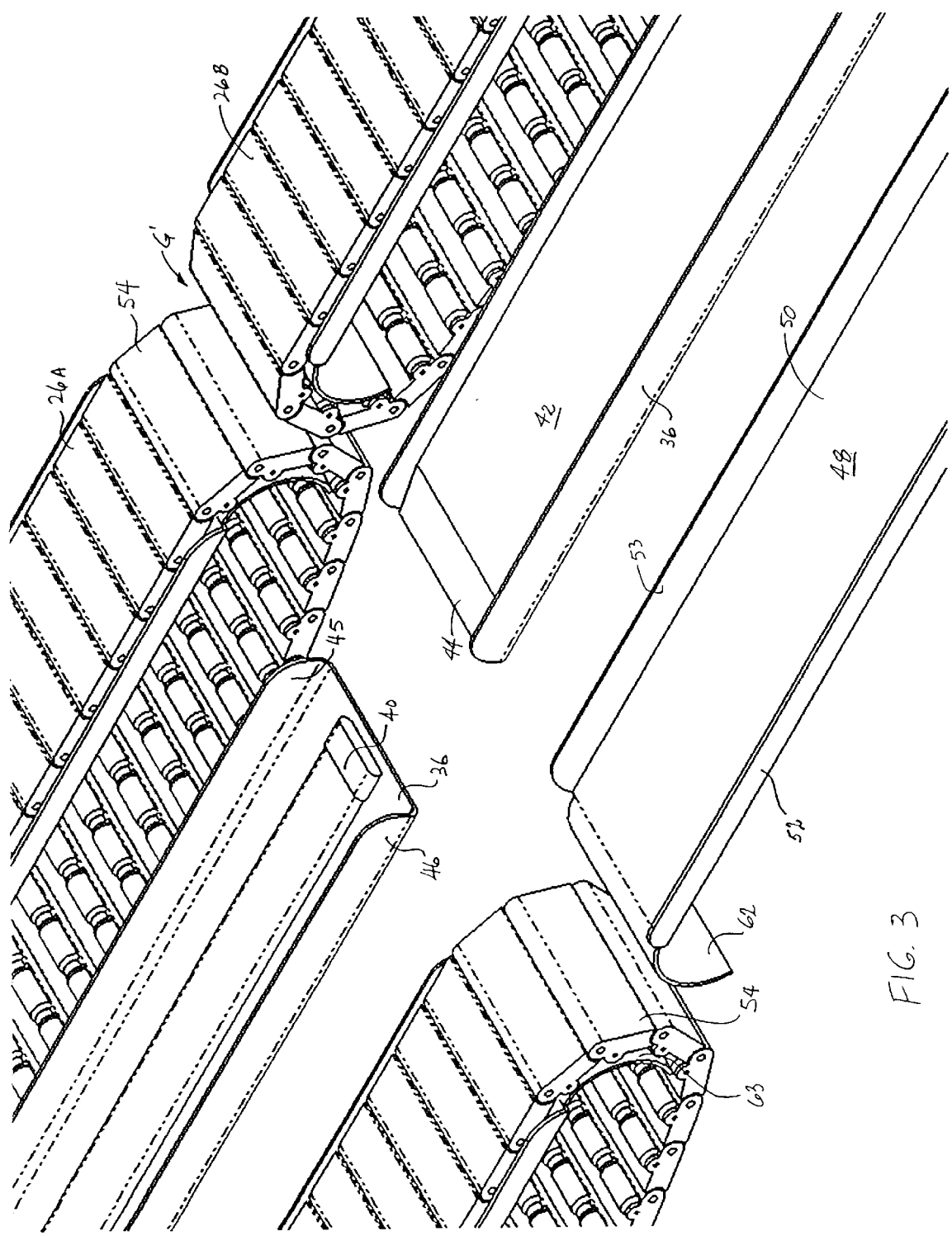
FIG. 3 is a portion of the zero-back-pressure conveyor as in FIG. 2 with the transport belt omitted to illustrate other features better.

Further details of the transport belt and the low-friction article support assemblies are shown blown up in FIGS. 2 and 3. The transport belt 22 is supported in the pan 36. The pan could be one long pan extending the length of the conveyor, but is shown in FIGS. 1–3 as a series of individual pans co-extensive with the article support assemblies 24, 26. This makes the conveyor modular in that similar sections can be added to create more zones. Resting on each pan is an inflatable air tube 40, similar to a section of fire hose with closed ends, such as the PNEUMA-SEAL inflatable seal manufactured by Presray Corporation of Pawling, N.Y., USA. A slider bed 42 sits atop the air tube in each accumulation zone. The slider bed is preferably made of a relatively slick, wear-resistant material, such as UHMW (ultra-high molecular weight) plastic, but any material suitable for use as a wearstrip for a conveyor belt is appropriate. The transport belt rides along the slider bed in each accumulation zone. Each end of the slider bed preferably has a sloped entrance/exit portion 44 to provide a smooth transition for the transport belt as it traverses the gap between consecutive zones. To confine the slider bed, the pan preferably has upstanding sides 45, 46. As is described subsequently in more detail, the inflatable air tube in each accumulation zone can be controllably inflated and deflated to raise and lower the slider bed and, thereby, the transport belt.

Each low-friction article support assembly 24, 26 comprises a preferably stationary support roller bed 48. The bed includes a flat upper surface 50 and flanking upstanding side walls 52, 53 to form a guide channel. An endless inverted roller belt loop 54 is supported on the roller bed. The outer side 58 of the inverted roller belt loop supported on the flat upper surface of the roller bed, forms an article-contacting surface defining a generally planar top supportway 56. The top supportway on the first side of the conveyor is generally coplanar with the top supportway 57 on the second side to jointly support articles. The inner side 59 of the belt loop includes rollers 60 that provide a low-friction roller-topped surface in rolling contact with the upper surface 50 of the roller bed. Because the rollers are on the inside of the loop, the belt is called an inverted roller belt. Arcuate extensions 62, 63 of the upper surface of the roller bed provide a smooth transition of the inverted roller belt loop from the top supportway to the lower returnway. The cylindrical rollers at the inner side are arranged to rotate freely about an axis transverse to the direction of transport. But the rollers could alternatively be spherical—as long as they provide low-friction rolling contact with the roller bed in the transport direction. This low-friction arrangement permits supported articles to be urged along the conveying path even manually with little effort.

Figure 4B:
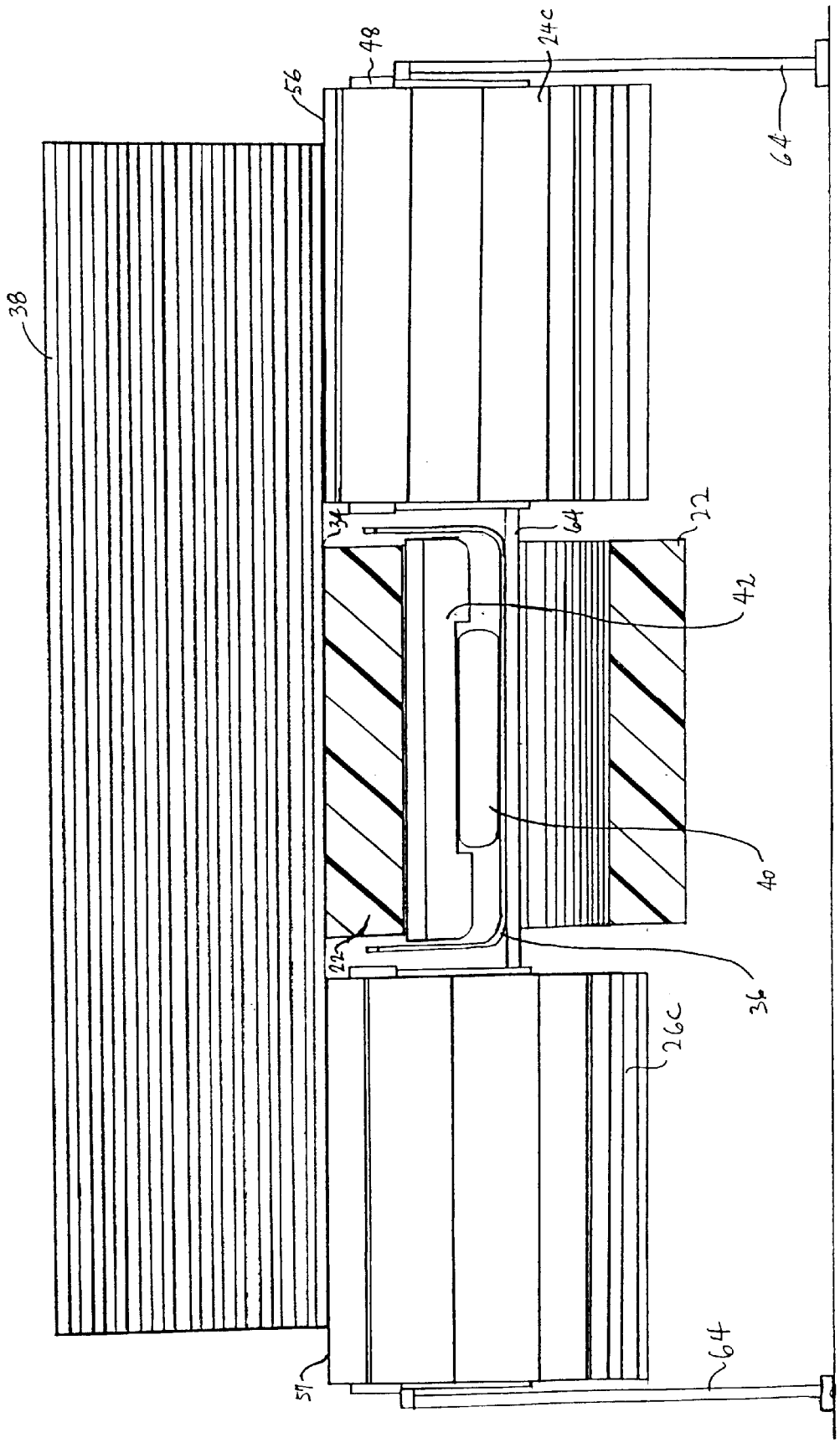
FIG. 4B is a cross-sectional view as in FIG. 4A, but with the transport belt in a raised transport position.

The operation and structure of the zero-back-pressure conveyor is described with reference to FIGS. 4A and 4B. The support roller beds 48 and the pans 36 are supported by a framework 64. Articles 38, such as a stack of cardboard sheets, rest on the supportways 56, 57 with the transport belt positioned between and below the bottom of the stack. In FIG. 4A, the air tube 40 is deflated and the upper carryway 34 of the transport belt is in a position out of contact with the bottom of the stack. In this position, the transport belt does not move the stack. The stack remains in the accumulation zone supported by the inverted roller belt loops on each side. In FIG. 4B, the air tube 40 is shown inflated, raising the slider bed and the transport belt into a different position in which the carryway 34 of the transport belt is generally coplanar with the supportways 56, 57 of the roller belt loops. In this position, the transport conveyor frictionally contacts the bottom of the stack and transports it in the transport direction. The stack remains supported stably on the supportways. As the transport belts moves the stack, the stack, in turn, drags the inverted roller belt loops along with it. In this way, there is little or no relative motion between the stack and any of the supporting belts. Because of the rollers, the inverted roller belt loops move easily with little frictional resistance.

Figure 5:
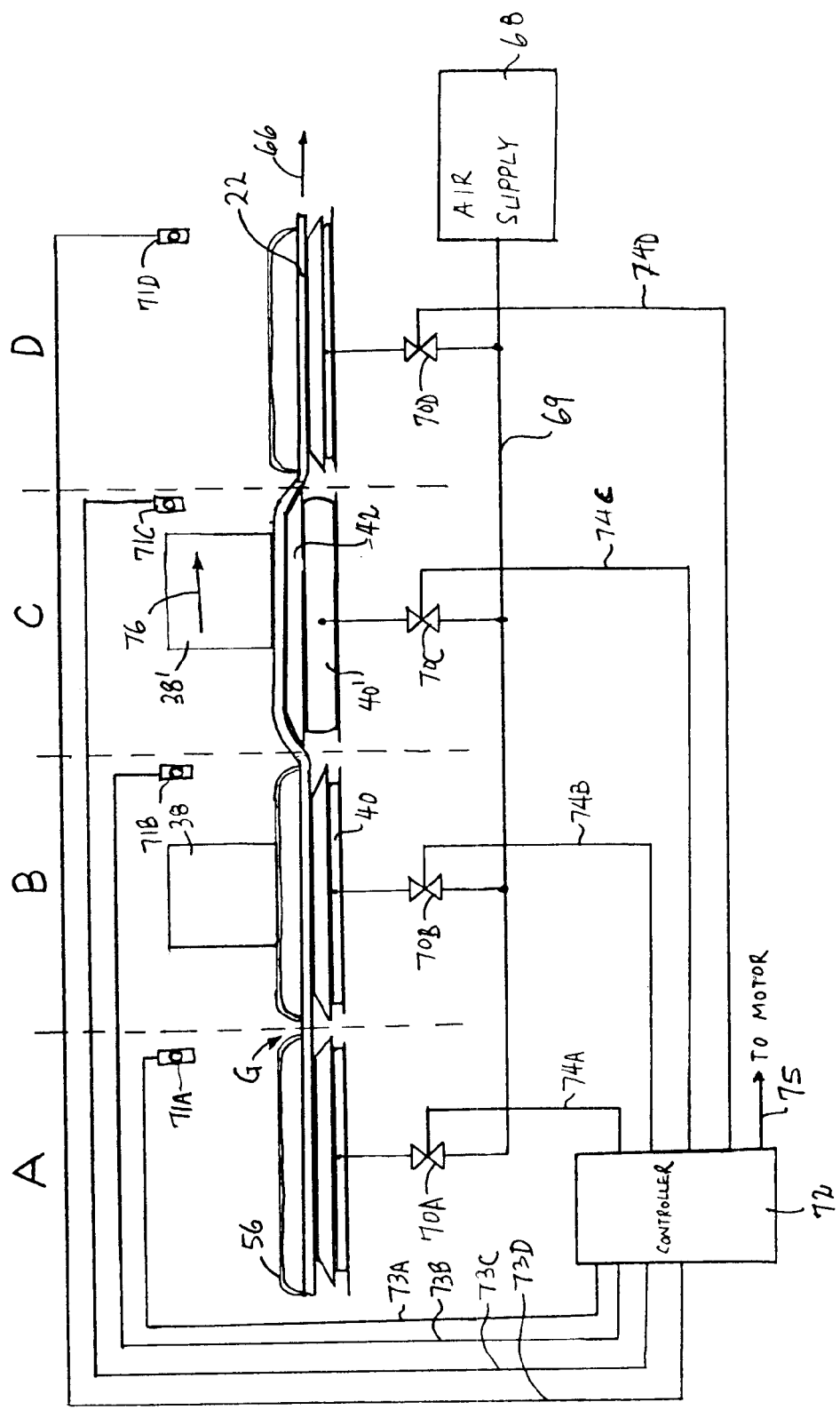
FIG. 5 is a part side elevation pictorial, part schematic diagram of a zero-back-pressure conveyor as in FIG. 1 with one version of accumulation control shown schematically.

The operation of the conveyor and, especially, the transport-belt-positioning mechanism, is shown further in FIG. 5. The transport belt 22 is shown traveling in a direction given by arrow 66. Articles 38 and 38' are shown supported on the supportways in accumulation zones B and C. In the belt positioning mechanism of this example, the air tubes are connected to or disconnected from a source of air 68 through air lines 69 by control valves 70A–D for each zone. A controller 72, such as a PLC (programmable logic controller) or any sort of industrial controller, opens, shuts, and vents the valves by sending signals over control lines 74A–D to inflate, maintain, or deflate the pneumatic pressure in each air tube. Position sensors 71A–D, such as optical sensors, proximity switches, or other appropriate devices, located at one or more places in the zones, provide feedback over signal lines 73A–D to the controller indicative of the presence or absence of a conveyed article. The controller may also control the speed or direction of rotation of the drive motor 25 for the transport belt over control lines 75. In the example of FIG. 5, only the valve 70C in zone C is open to inflate the air tube 40', raising the slider bed 42 and the portion of the transport belt in zone C into a first position in contact with the article 38' to move it in the direction of arrow 76 toward the next consecutive accumulation zone D. The other three valves 70A, 70B, and 70D are controlled to deflate the air tubes 40 in zones A, B, and D and decouple the transport belt from contact with any articles in those zones. This decoupling is achieved as shown in the drawings by a pneumatic belt-positioning mechanism that raises and lowers the transport belt. The decoupling could alternatively be achieved by raising and lowering the individual supportways relative to the carryway of the transport belt. Controlling the relative position of the supportways along the carryway controls the coupling of the transport belt and the articles. With these arrangements, the zonal control and article separation required for zero-back-pressure accumulation is achieved. In the example of FIG. 5, each article fits within a single zone. It is, of course, possible to use the conveyor to control the pitch of articles that are longer than each zone of FIG. 5 and that straddle two or more zones at all times. Even though an article is longer than a zone as defined in FIG. 5, it can be stopped at each zone. Thus, the article's pitch can be controlled in increments smaller than its length.

One version of each module 78 of the inverted roller top belt is shown in the example of FIG. 6. The module includes a module body 79 extending from a first end 80 to a second end 82 in a roll direction 83. The module extends through its thickness from a first side 84 to an opposite second side 86. The first side is generally flat; the second side includes, in the example, three cylindrical rollers 60 extending from recesses 88 in the body. The rollers are supported between stanchions 90. An axle 92 spans the stanchions through aligned openings 94 and retains the rollers rotatably in place through central bores 96. Individual modules are connected together end to end to form an endless conveyor belt loop. Hinge elements 98 along the first end 80 interleave with offset hinge elements 99 along the second end of a successive module. Aligned apertures 100 through the hinge elements admit a hinge pin 102 to interconnect the modules hingedly into a belt loop. The loop is formed with the rollers on the inside to form an inverted roller belt capable of low-friction rolling contact with a support roller bed and with the flat surfaces on the outside to provide a smooth support platform for conveyed articles.

Although the invention has been described in detail with reference to preferred versions, other versions are possible. For example, the conveyor could be configured with a single series of inverted roller belt loops down the center flanked by a pair of transport belts. Portions of each of the inverted roller belt loops could be lifted above the carryway of the transport belts to decouple the conveyed articles from the transport belt. As another example, the belt-positioning mechanism could be achieved other than with inflatable air tubes. Other pneumatic, hydraulic, or mechanical lifts could be used to raise and lower portions of the belt in a controlled manner. Therefore, the spirit and scope of the claims should not be limited to the description of the preferred versions.

What is claimed is:

1. A zero-back-pressure conveyor for conveying articles with zero back-pressure along a conveying path, comprising:

a first series of inverted roller belt loops arranged end to end with a gap between consecutive inverted roller belt loops, the first series of inverted roller belt loops defining a first side of a conveying path;

a second series of inverted roller belt loops similarly arranged parallel to and laterally spaced from the first series of inverted roller belt loops and defining a second side of the conveying path with gaps between consecutive inverted roller belt loops corresponding to gaps on the first side, wherein conveyed articles are supported from below by the first series of inverted roller belt loops and the second series of inverted roller belt loops;

a driven transport belt disposed between the first and second series of inverted roller belt loops and driven parallel thereto;

wherein accumulation zones are formed along the conveying path, each accumulation zone being defined along the conveying path between a first pair of corresponding gaps and a second pair of corresponding gaps, and wherein the driven transport belt is positionable within each accumulation zone between a first position in which the driven transport belt contacts the bottom of the conveyed articles supported on the first and second series of inverted roller belt loops to move the articles along the conveying path and a second position out of contact with the articles supported on the first and second series of inverted roller belt loops.

2. A zero-back-pressure conveyor as in claim 1, further comprising a roller bed for supporting the inverted roller belt loop in rolling contact.

3. A zero-back-pressure conveyor as in claim 1, further comprising a controller to position the driven transport belt in each accumulation zone.

4. A zero-back-pressure conveyor as in claim 1, wherein the inverted roller belt loop comprises an articulated belt loop including an outer article-contacting surface and an inner roller-topped surface for rolling contact with a roller bed.

5. A zero-back-pressure conveyor as in claim 4, wherein the inverted roller belt loop includes freely rotatable rollers at the inner roller-topped surface.

6. A zero-back-pressure conveyor as in claim 1, further comprising a positionable slider bed in each accumulation zone disposed beneath the driven transport belt to support the belt in the first position and in the second position.

7. A zero-back-pressure conveyor as in claim 6, further comprising an inflatable air tube disposed beneath the slider bed to raise and lower the slider bed and the driven transport belt between the first and second positions.

8. A zero-back-pressure conveyor, comprising:

a pan;

an air tube supported in the pan;

a slider bed supported on the air tube;

a transport belt supported on the slider bed;

a controller for controlling the air supply to the air tube to raise and lower the slider bed and thereby the conveyor belt;

first and second support roller beds flanking the conveyor belt on opposite sides of the air tube; and first and second inverted roller belts forming endless loops with rollers on the inner sides of the loops adapted to roll in the first and second support roller beds.

9. A zero-back-pressure conveyor for conveying articles, the conveyor comprising:

a conveyor belt drivable in a transport direction through a series of accumulation zones, each accumulation zone comprising:
a first low-friction article support assembly disposed along a first side of the conveyor belt; and
a second low-friction article support assembly disposed along an opposite second side of the conveyor belt; the first and second low-friction article support assemblies each including:
a stationary roller bed; and
an inverted roller belt loop including:
an outer article-contacting surface; and
rollers along an inner side of the belt loop in rolling contact with the roller bed for low-friction movement of the inverted roller belt loop in the transport direction caused by the movement of articles supported on the outer article-contacting surface;

a belt-positioning mechanism to raise and lower the transport belt between a first raised position and a second lowered position;

wherein articles supported on the first low-friction article support assembly and on the opposite bottom side on the second low-friction article support assembly are contacted by the conveyor belt in the first raised position and conveyed in the transport direction atop the inverted roller belt loops moving with the articles to an adjacent accumulation zone and wherein the supported articles are out of contact with the conveyor belt in the second lowered position to remain stationed in the accumulation zone.

10. A zero-back-pressure conveyor, comprising first and second series of inverted roller belt loops arranged in pairs oppositely flanking a transport belt forming an upper carryway and drivable in a transport direction between the series of inverted roller belt loops, each of the first and second inverted roller belt loops forming a top supportway wherein the top supportways of each pair of first and second inverted roller belt loops are generally coplanar and arranged to jointly support an article on the top supportways and wherein the transport belt and each pair of first and second inverted roller belt loops are relatively positionable between a first position in which the upper carryway of the transport belt is generally coplanar with the supportways of the pair of flanking belt loops for contact with articles to a second position in which the upper carryway is below the plane of the flanking supportways and out of contact with articles.

11. A zero-back-pressure conveyor as in claim 10, wherein the inverted roller belt loops each comprise:

a plurality of belt modules and hinge pins, the belt modules including:
a module body extending from a first end to a second end in a roll direction and through the body thickness from a first side to an opposite second side, wherein:
the first side is characterized by a generally flat surface, and
the second side is characterized by at least one roller enabling the module body to be rolled in the roll direction;
the module body further including hinge elements along the first and second ends for receiving hinge pins therethrough;
wherein consecutive modules are hingedly interlinked by hinge pins through interleaved hinge elements at the first and second ends of consecutive modules into an endless inverted roller belt loop with the modules arranged with the first sides outward and the second sides inward to from the loop with an inner roller side and an outer support side.

* * * * *